(12) United States Patent
Ito

(10) Patent No.: US 8,600,313 B2
(45) Date of Patent: Dec. 3, 2013

(54) RADIO COMMUNICATION METHOD IN RADIO COMMUNICATION SYSTEM, TERMINAL APPARATUS, BASE STATION APPARATUS, AND RADIO COMMUNICATION SYSTEM

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 12/893,186

(22) Filed: Sep. 29, 2010

(65) Prior Publication Data
US 2011/0021226 A1    Jan. 27, 2011

Related U.S. Application Data

(60) Continuation of application No. PCT/JP2008/000717, filed on Mar. 25, 2008, and a division of application No. 12/888,587, filed on Sep. 23, 2010.

(51) Int. Cl.
*H04B 1/04* (2006.01)
(52) U.S. Cl.
USPC .............................. 455/69; 455/102; 455/93
(58) Field of Classification Search
USPC ................ 455/69, 561, 562.1, 93, 102, 103, 455/115.1; 375/295, 298
See application file for complete search history.

(56) References Cited

U.S. PATENT DOCUMENTS

| | | | |
|---|---|---|---|
| 7,974,258 B2 * | 7/2011 | Holt ............................. | 370/344 |
| 8,064,834 B2 | 11/2011 | Kim et al. | |
| 8,073,451 B2 | 12/2011 | Nobukiyo | |
| 8,130,857 B2 | 3/2012 | Kim et al. | |
| 8,477,735 B1 * | 7/2013 | Pawar et al. ................. | 370/332 |
| 2004/0082356 A1 | 4/2004 | Walton et al. | |
| 2006/0057978 A1 | 3/2006 | Love et al. | |
| 2006/0245346 A1 * | 11/2006 | Bar-Ness et al. ............. | 370/203 |
| 2007/0195906 A1 | 8/2007 | Kim et al. | |
| 2007/0264936 A1 | 11/2007 | Kim et al. | |
| 2007/0293233 A1 | 12/2007 | Inoue et al. | |
| 2008/0037413 A1 | 2/2008 | Gu et al. | |
| 2008/0095263 A1 * | 4/2008 | Xu et al. ....................... | 375/295 |
| 2008/0214126 A1 | 9/2008 | Holt | |
| 2008/0298316 A1 | 12/2008 | Bitran et al. | |
| 2009/0225666 A1 | 9/2009 | Ofuji et al. | |

(Continued)

FOREIGN PATENT DOCUMENTS

| | | |
|---|---|---|
| JP | 2006-504335 | 2/2006 |
| JP | 2006-87111 | 3/2006 |

(Continued)

OTHER PUBLICATIONS

Decision of Rejection dated Jun. 18, 2013, from corresponding Japanese Application No. 2010-505023.
Decision to Dismiss Amendment dated Jun. 18, 2013, from corresponding Japanese Application No. 2010-210494.
Chinese First Office Action dated Aug. 31, 2012, from corresponding Chinese Application No. 200880128242.1.

(Continued)

*Primary Examiner* — Blane J Jackson
(74) *Attorney, Agent, or Firm* — Katten Muchin Rosenman LLP

(57) ABSTRACT

A radio communication method in a radio communication system which performs radio communication between a terminal apparatus and a base station apparatus, the radio communication method including: selecting one of a first transmission method or a second transmission method on the basis of transmission power of transmission signal transmitted from the terminal apparatus, in the base station apparatus; and transmitting the transmission signal to the base station apparatus by the selected first or second transmission method, in the terminal apparatus.

8 Claims, 16 Drawing Sheets

(56) References Cited

U.S. PATENT DOCUMENTS

| | | |
|---|---|---|
| 2010/0027409 A1 | 2/2010 | Kwon et al. |
| 2010/0039927 A1 | 2/2010 | Noh et al. |
| 2010/0061480 A1 | 3/2010 | Kashiwase et al. |
| 2010/0091919 A1 | 4/2010 | Xu et al. |
| 2010/0093386 A1 | 4/2010 | Damnjanovic et al. |
| 2010/0142490 A1 | 6/2010 | Kim et al. |
| 2010/0272055 A1 | 10/2010 | Noh et al. |
| 2010/0278168 A1 | 11/2010 | Kwon et al. |
| 2012/0014339 A1 | 1/2012 | Bitran et al. |
| 2012/0172081 A1* | 7/2012 | Love et al. .................... 455/522 |
| 2013/0058297 A1 | 3/2013 | Ishii et al. |
| 2013/0165132 A1* | 6/2013 | Goedken et al. ............. 455/450 |

FOREIGN PATENT DOCUMENTS

| | | |
|---|---|---|
| JP | 2007-267070 | 10/2007 |
| JP | 2007-336421 | 12/2007 |
| JP | 2008-11261 | 1/2008 |
| WO | 02/099995 | 12/2002 |
| WO | 2007/084988 | 7/2007 |
| WO | 2007/091815 | 8/2007 |
| WO | 2007/111186 | 10/2007 |
| WO | 2008/003087 | 1/2008 |
| WO | 2008/057969 | 5/2008 |

OTHER PUBLICATIONS

United States Office Action dated Sep. 17, 2012, from corresponding U.S. Appl. No. 12/888,587.
Chinese First Office Action dated Mar. 5, 2013, from corresponding Chinese Application No. 201010575671.2.
United States Office Action dated Apr. 10, 2013, from corresponding U.S. Appl. No. 12/888,587.
Japanese Office Action dated Nov. 13, 2012, from corresponding Japanese Application No. 2010-505023.
Japanese Office Action dated Nov. 13, 2012, from corresponding Japanese Application No. 2010-210494.
International Search Report dated Jul. 8, 2008, from the corresponding International Application.
3GPP TS 36.211 V8.0.0, 3rd Generation Partnership Project; Technical Specification Group Radio Access Network; Evolved Universal Terrestrial Radio Access (E-UTRA); Physical channels and modulation (Release 8), Sep. 2007.
Hikmet Sari, et al. "Transmission Techniques for Digital Terrestrial TV Broadcasting" IEEE Communications Magazine, Feb. 1995.
European Search Report dated Mar. 3, 2011 from corresponding European Application No. 10 18 1175.
U.S. Office Action dated Aug. 30, 2013 from the corresponding U.S. Appl. No. 12/888,587.

* cited by examiner

FIG. 4

| TRANSMISSION METHOD | MODULATION SCHEME | NUMBER OF RBs | $P_r$ (TRANSMISSION POWER REDUCTION AMOUNT) |
|---|---|---|---|
| OFDM | QPSK | 1 | 1dB |
| SC-FDMA | QPSK | 1 | 0dB |
| OFDM | 16QAM | 1 | 3dB |
| SC-FDMA | 16QAM | 1 | 2dB |
| OFDM | QPSK | 2 | 3.5dB |
| SC-FDMA | QPSK | 2 | 2.5dB |
| OFDM | 16QAM | 2 | 4.5dB |
| SC-FDMA | 16QAM | 2 | 3.5dB |

54

| MODULATION SCHEME | NUMBER OF RBs | TRANSMISSION METHOD | $P_r$ (TRANSMISSION POWER REDUCTION AMOUNT) |
|---|---|---|---|
| 16QAM | 1 | OFDM | 3dB |
| 16QAM | 1 | SC-FDMA | 2dB |

RADIO COMMUNICATION METHOD IN RADIO COMMUNICATION SYSTEM, TERMINAL APPARATUS, BASE STATION APPARATUS, AND RADIO COMMUNICATION SYSTEM

CROSS REFERENCE TO RELATED APPLICATIONS

This application is a continuation of International Application No. PCT/JP2008/000717, filed on Mar. 25, 2008, now pending, herein incorporated by reference.

TECHNICAL FIELD

The present invention relates to a radio communication method, a terminal apparatus, a base station apparatus, and a radio communication system.

BACKGROUND ART

In 3GPP (3rd Generation Partnership Project), LTE (Long Term Evolution, or Evaluated UTRA and UTRAN) is under investigation as a next-generation radio communication standard (Non-Patent Document 1 illustrated below, for example).

In LTE, OFDM (Orthogonal Frequency Division Multiplexing) is utilized for a downlink from a base station to a terminal, and SC-FDMA (Single-Carrier Frequency Division Multiple Access) is utilized for an uplink from the terminal to the base station.

The OFDM is a transmission method in which a frequency band is divided into a plurality of sub-carriers and data are transmitted while carried directly on each sub-carrier. On the other hand, the SC-FDMA is a transmission method in which data transformed by DFT (Discrete Fourier Transform) is carried on the sub-carrier and is transmitted. FIG. 18 and FIG. 19 illustrate configuration examples of signal processing circuits employed in SC-FDMA and OFDM, respectively. Referring to FIG. 18, a DFT (Discrete Fourier Transform) unit 101 is included in front of a sub-carrier mapping unit, and DFT-processed signal is input successively into the sub-carrier mapping unit 102, an IDFT (Inverse Discrete Fourier Transform) unit 103, and a CP (Cyclic Prefix) insertion unit 104. Referring to FIG. 19, transmission data is input into a sub-carrier mapping unit 111 and then input successively into an IDFT unit 112 and a CP insertion unit 113.

On the other hand, the base station or the terminal uses an amplifier to transmit data. The amplifier has a problem that linearity cannot be maintained and the data are distorted, when an input power is large. When the data are distorted, out-of-band emission power increases. An upper limit value of the out-of-band emission power (hereinafter, "ACLR") is determined by an ACLR (Adjacent Carrier Leakage Ratio) standard, and when the data distortion is large, the ACLR can no longer be satisfied.

In consideration of the ACLR, the SC-FDMA is a favorable method due to its low PAPR (Peak to Average Power Ratio), and therefore SC-FDMA is applied to the uplink from the terminal in LTE.

Non-Patent Document 1: 3GPP TS 36. 211V8. 0. 0 (2007-09)
Non-Patent Document 2: Hikmet Sari, Geroges Karam and Isabell Jeanclaude, "Transmission Techniques for Digital Terrestrial TV Broadcasting", IEEE Communication Magazine, pp. 100-109, February 1995

DISCLOSURE OF THE INVENTION

Problems to be Solved by the Invention

Although the SC-FDMA is advantageous in terms of the PAPR, because the sub-carrier which is continuous on a frequency axis is used, the sub-carrier cannot be selected non-continuously on the frequency axis, and the SC-FDMA has a constraint in terms of scheduling during resource allocation and the like. Also, as illustrated in FIG. 20 (Non-Patent Document 2, for example), errors are likely to occur in relation to another method even under an identical reception E/N condition.

Accordingly, it is an object of the present invention to improve inconvenient which occurs when the SC-FDMA is applied.

More preferably, it is an object to improve in consideration of scheduling flexibility or quality when the SC-FDMA is applied.

Means for Solving the Problem

According to an aspect of the present invention, a radio communication method in a radio communication system which performs radio communication between a terminal apparatus and a base station apparatus, the radio communication method including: selecting one of a first transmission method or a second transmission method on the basis of transmission power of transmission signal transmitted from the terminal apparatus, in the base station apparatus; and transmitting the transmission signal to the base station apparatus by the selected first or second transmission method, in the terminal apparatus.

Also, according to an another aspect of the present invention, a radio communication method in a radio communication system which performs radio communication between a terminal apparatus and a base station apparatus, the radio communication method including: selecting a first transmission method if the terminal apparatus transmits transmission signal by MIMO or selecting a second transmission method if not, in the base station apparatus; and transmitting the transmission signal to the base station apparatus by the selected first or second transmission method, in the terminal apparatus.

Furthermore, according to an another aspect of the present invention, a terminal apparatus for performing radio communication with a base station apparatus, the terminal apparatus including: a reception unit which receives from the base station apparatus transmission method selection information indicating selected transmission method, which is selected one of a first transmission method or a second transmission method on the basis of transmission power of transmission signal transmitted from the terminal apparatus; and a transmission unit which transmits the transmission signal to the base station apparatus by the first or second transmission method on the basis of the transmission method selection information.

Furthermore, according to an another aspect of the present invention, a terminal apparatus for performing radio communication with a base station apparatus, the terminal apparatus including: a reception unit which receives from the base station apparatus transmission method selection information indicating that a first transmission method is selected if the terminal apparatus transmits by MIMO or a second transmission method is selected if not; and a transmission unit which transmits the transmission signal to the base station apparatus by the first or second transmission method on the basis of the transmission method selection information.

Furthermore, according to an another aspect of the present invention, a base station apparatus for performing radio communication with a terminal apparatus, the base station apparatus including: a selection unit which selects one of a first transmission method or a second transmission method on the basis of transmission power of transmission signal transmitted from the terminal apparatus; and a transmission unit which transmits transmission method selection information indicating the selected first or second transmission method to the terminal apparatus, wherein the terminal apparatus transmits the transmission signal by the selected first or second transmission method.

Furthermore, according to an another aspect of the present invention, a base station apparatus for performing radio communication with a terminal apparatus, the base station apparatus including: a selection unit which selects a first transmission method if the terminal apparatus transmits transmission signal by MIMO or selects a second transmission method if not; and a transmission unit which transmits transmission method selection information indicating the selected first or second transmission method to the terminal apparatus, wherein the terminal apparatus transmits the transmission signal by the selected first or second transmission method.

Furthermore, according to an another aspect of the present invention, a radio communication system, including: a terminal apparatus; and a base station apparatus, wherein radio communication is performed between the terminal apparatus and the base station apparatus, the base station apparatus includes: a selection unit which selects one of a first transmission method or a second transmission method on the basis of transmission power of transmission signal transmitted from the terminal apparatus; and a transmission unit which transmits transmission method selection information indicating the selected first or second transmission method, and the terminal apparatus includes: a reception unit which receives the transmission method selection information; and a transmission unit which transmits the transmission signal to the base station apparatus by the first or said second transmission method on the basis of the transmission method selection information.

Furthermore, according to an another aspect of the present invention, a radio communication system, including: a terminal apparatus; and a base station apparatus, wherein radio communication is performed between the terminal apparatus and the base station apparatus, the base station apparatus includes: a selection unit which selects a first transmission method if the terminal apparatus transmits transmission signal by MIMO, or selects a second transmission method if not; and a transmission unit which transmits transmission method selection information indicating the selected first or second transmission method, and the terminal apparatus includes: a reception unit which receives the transmission method selection information; and a transmission unit which transmits the transmission signal to the base station apparatus by the first or second transmission method on the basis of the transmission method selection information.

Furthermore, according to an another aspect of the present invention, a radio communication system, including: a terminal apparatus; and a base station apparatus, wherein radio communication is performed between the terminal apparatus and the base station apparatus, the base station apparatus or the terminal apparatus includes: a modulation unit which is adaptable to a plurality of transmission method selected in accordance with magnitude of transmission power; and a transmission unit which transmits signal modulated by the modulation unit, and the plurality of transmission method include SC-FDMA method and OFDM method, and a selection is performed to switch from the OFDM method to the SC-FDMA method in response to increase in the transmission power.

Advantageous Effect of the Invention

According to the present invention, the inconvenient which occurs when the SC-FDMA is applied, can be improved.

BRIEF DESCRIPTION OF THE DRAWINGS

FIG. 4 illustrates an example of an MPR table;

Figure 1:
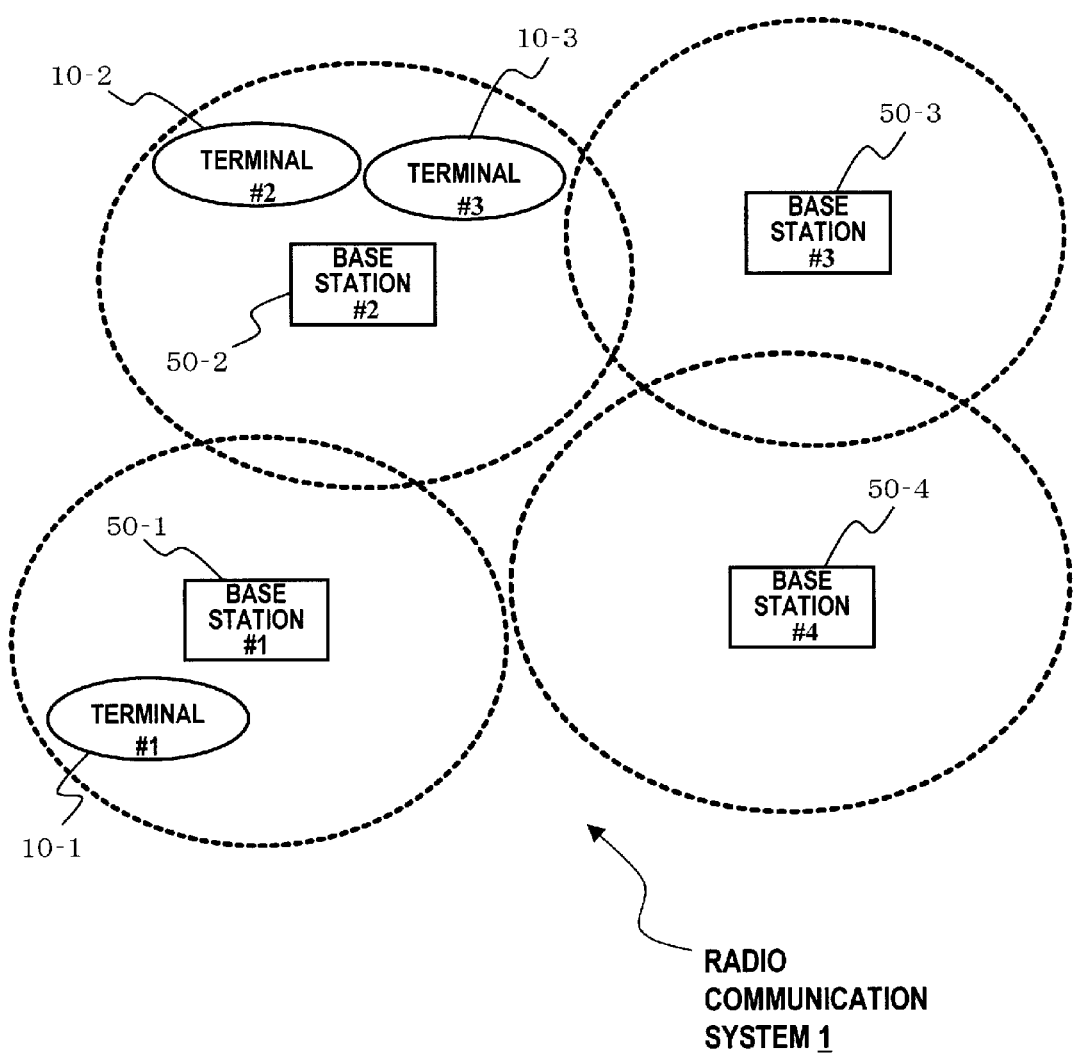
FIG. 1 illustrates a configuration example of a radio communication system.

EXPLANATION OF REFERENCE NUMERALS 1 radio communication system
10 (10-1 to 10-3) terminal apparatus
11 known signal reception unit
12 path loss calculation unit
13 transmission power calculation unit
14 known signal transmission unit
15 Δ(maximum power−current power) transmission unit
17 scheduling transmission unit
18 transmission method reception unit
19 data signal modulation unit
20 data signal transmission unit
50 (50-1 to 50-4) base station apparatus
51 known signal transmission unit 52 Δ(maximum power−current power) reception unit
53 scheduling request reception unit
54 MPR table
55 transmission method determination unit
56 transmission method transmission unit
57 data reception unit
60 transmission bit count table
70 network reception unit

BEST MODE FOR CARRYING OUT THE INVENTION

Best mode for carrying out the present invention will be described below.
[First Embodiment]
First, a first embodiment will be described. FIG. 1 illustrates a configuration example of a radio communication system 1. The radio communication system 1 includes terminal apparatuses ("terminals" hereinafter) 10-1 to 10-3 and base station apparatuses ("base stations" hereinafter) 50-1 to 50-4. Dotted lines indicate cell ranges of the respective base stations 50-1 to 50-4. When the terminals 10-1 to 10-3 are positioned in a cell, the terminals 10-1 to 10-3 can perform radio communication with the corresponding base stations 50-1 to 50-4.

Figure 2:
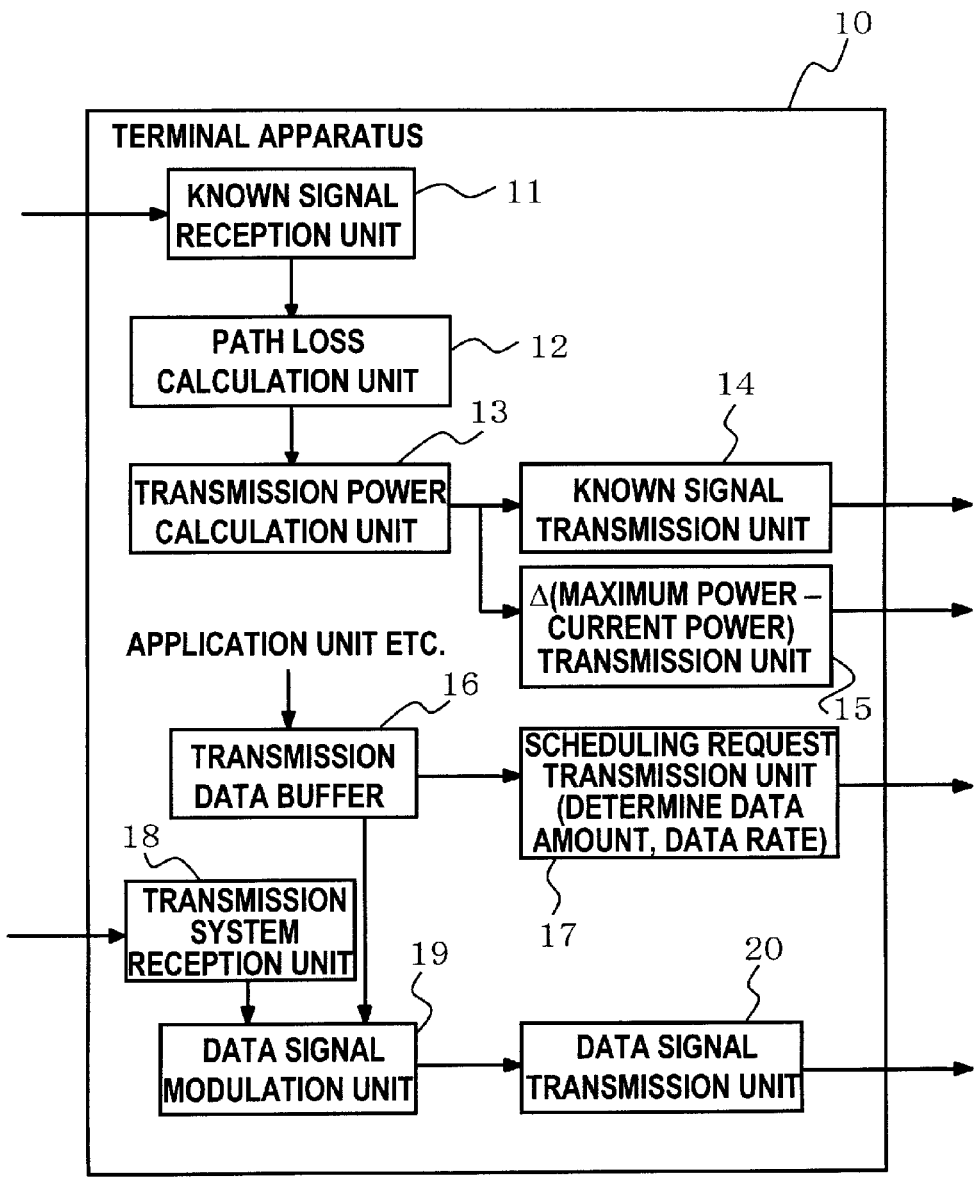
FIG. 2 illustrates a configuration example of a terminal apparatus.
Figure 3:
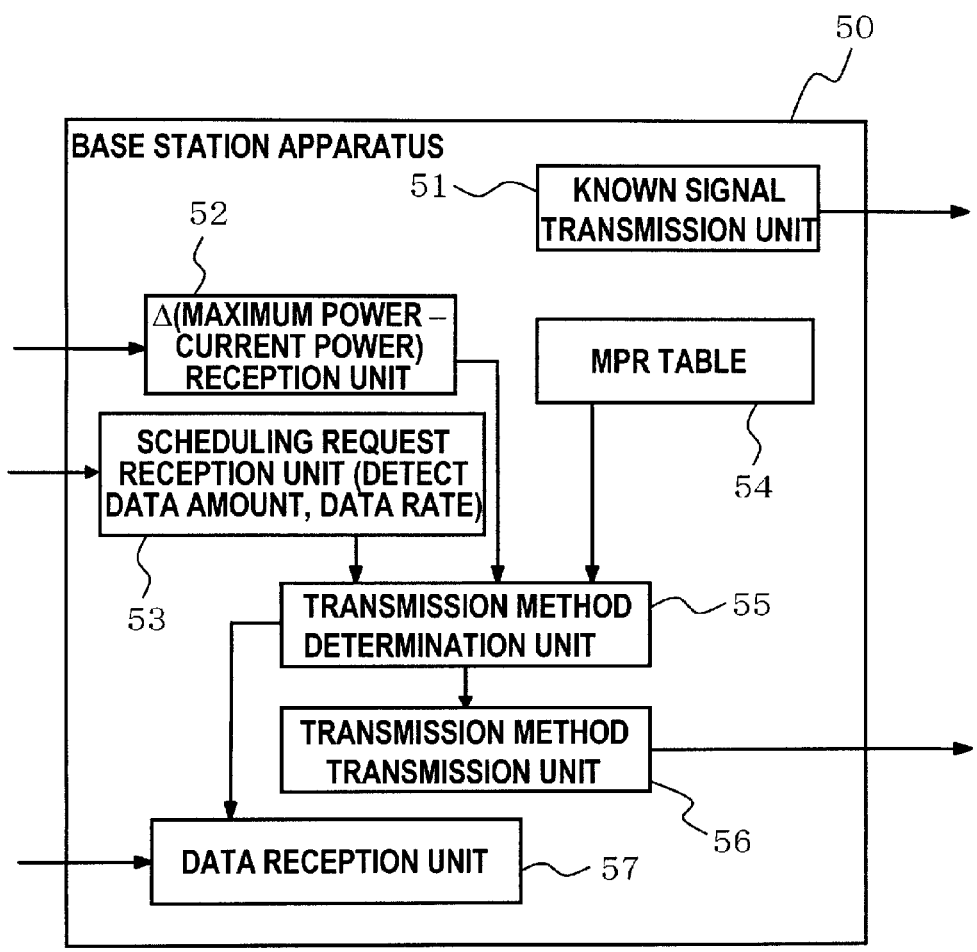
FIG. 3 illustrates a configuration example of a base station apparatus.

FIG. 2 and FIG. 3 illustrates configuration examples of the terminal 10 and the base station 50, respectively. The terminal 10 includes a known signal reception unit 11, a path loss calculation unit 12, a transmission power calculation unit 13, a known signal transmission unit 14, a Δ(maximum power−current power) transmission unit (Δ transmission unit hereinafter) 15, a transmission data buffer 16, a scheduling request transmission unit 17, a transmission method reception unit 18, a data signal modulation unit 19, and a data signal transmission unit 20.

The known signal reception unit 11 receives a known signal from the base station 50 and outputs the received known signal to the path loss calculation unit 12. For example, the known signal is transmitted periodically from the base station 50.

The path loss calculation unit 12 calculates a downlink direction propagation path loss (a path loss PL) relative to the base station 50 on the basis of the known signal, and outputs the calculated path loss PL to the transmission power calculation unit 13.

The transmission power calculation unit 13 calculates a transmission power on the basis of the path loss PL and so on. A following equation is used in the calculation.

$$P_t = P_{max} \times \min\left\{1, \max\left[R_{min}, \left(\frac{PL}{PL_{x-ile}}\right)^x\right]\right\}$$ [Numeral 1]

Here, $P_t$ indicates a data transmission power of the terminal 10 envisaged in accordance with the position of the terminal 10, $P_{max}$ is a maximum transmission power determined from capacity of the terminal 10, PL is the path loss, and $PL_{x-ile}$ and $R_{min}$ are constants of power control. The maximum transmission power $P_{max}$ and the two constants $PL_{x-ile}$, $R_{min}$ are stored in a memory, for example, the transmission power calculation unit 13 reads from the memory, and calculates together with the path loss PL from the path loss calculation unit 12.

The known signal transmission unit 14 transmits the known signal periodically to the base station 50, for example.

The Δ transmission unit 15 calculates a difference Δ between the maximum transmission power $P_{max}$ and the transmission power $P_t$, and transmits the calculated difference Δ to the base station 50. The difference Δ indicates a decrease width from the maximum transmission power $P_{max}$ corresponding to a current position of the terminal 10. Note that the difference Δ may be calculated by the transmission power calculation unit 13.

The transmission data buffer 16 stores transmission data from an application unit or the like.

The scheduling request transmission unit 17 transmits a scheduling request to the base station 50 when transmission data is transmitted. The scheduling request transmission unit 17 calculates data amount of the transmission data stored in the transmission data buffer 16 or the like, and transmits the scheduling request including the data amount and a data rate.

The transmission method reception unit 18 receives a transmission method transmitted from the base station 50 and outputs to the data signal modulation unit 19.

The data signal modulation unit 19 reads the transmission data from the transmission data buffer 16 and modulates the transmission data on the basis of the transmission method from the transmission method reception unit 18.

The data signal transmission unit 20 transmits the modulated transmission data to the base station 50.

On the other hand, as illustrated in FIG. 3, the base station 50 includes a known signal transmission unit 51, a Δ (maximum power−current power) reception unit (Δ reception unit hereinafter) 52, a scheduling request reception unit 53, an MPR (Maximum Power Reduction) table 54, a transmission method determination unit 55, a transmission method transmission unit 56, and a data reception unit 57.

The known signal transmission unit 51 transmits the known signal to the terminal 10 periodically, for example.

The Δ reception unit 52 receives the difference Δ from the terminal 10 and outputs to the transmission method determination unit 55.

The scheduling request reception unit 53 receives the scheduling request from the terminal 10 and outputs to the transmission method determination unit 55.

The MPR table 54 stores respective values of a transmission method (OFDM or SC-FDMA), a modulation scheme (QPSK, 16QAM, and so on), a number of resource blocks (a number of sub-carriers that can be allocated on a frequency axis), and a reduction amount (a transmission power reduction amount hereinafter) $P_r$ from the maximum transmission power of the terminal 10.

The terminal 10 includes an amplifier to transmit the transmission data, and the transmission power reduction amount $P_r$ is a value indicating a decrease width by which the transmission power must be reduced from the maximum transmission power in order to satisfy so-called ACLR (the upper limit value of out-of-band emission power) due to constraint of the amplifier in the terminal 10.

FIG. 4 illustrates an example of the MPR table 54. As illustrated in FIG. 4, the value of the transmission power reduction amount $P_r$ differ in accordance with the transmission method, the modulation scheme, and the number of resource blocks. The reason is that transmission waveform transmitted from the terminal 10 differs according to the transmission method and so on, and the transmission power reduction amount $P_r$ takes different value according to the transmission waveform. If the transmission method is different even if the modulation scheme and the number of resource brocks are same, the transmission power reduction amount $P_r$ is different. The reason is that in OFDM, the PAPR of the transmission power is larger than in SC-FDMA, and therefore the transmission power must be reduced to satisfy the ACLR.

Returning to FIG. 3, the transmission method determination unit 55 determines the transmission method by selecting one of OFDM and SC-FDMA in accordance with the difference $\Delta$ and a maximum value of the transmission power reduction amount $P_r$ read from the MPR table 54. Determination processing will be described below. The transmission method determination unit 55 performs the determination processing when the scheduling request reception unit 53 receives the scheduling request, for example.

The transmission method transmission unit 56 transmits the determined transmission method. The terminal 10 transmits the transmission data on the basis of the transmission method (see FIG. 2).

The data reception unit 57 receives the transmission data from the terminal 10 and performs reception processing on the basis of the transmission method.

Figure 5:
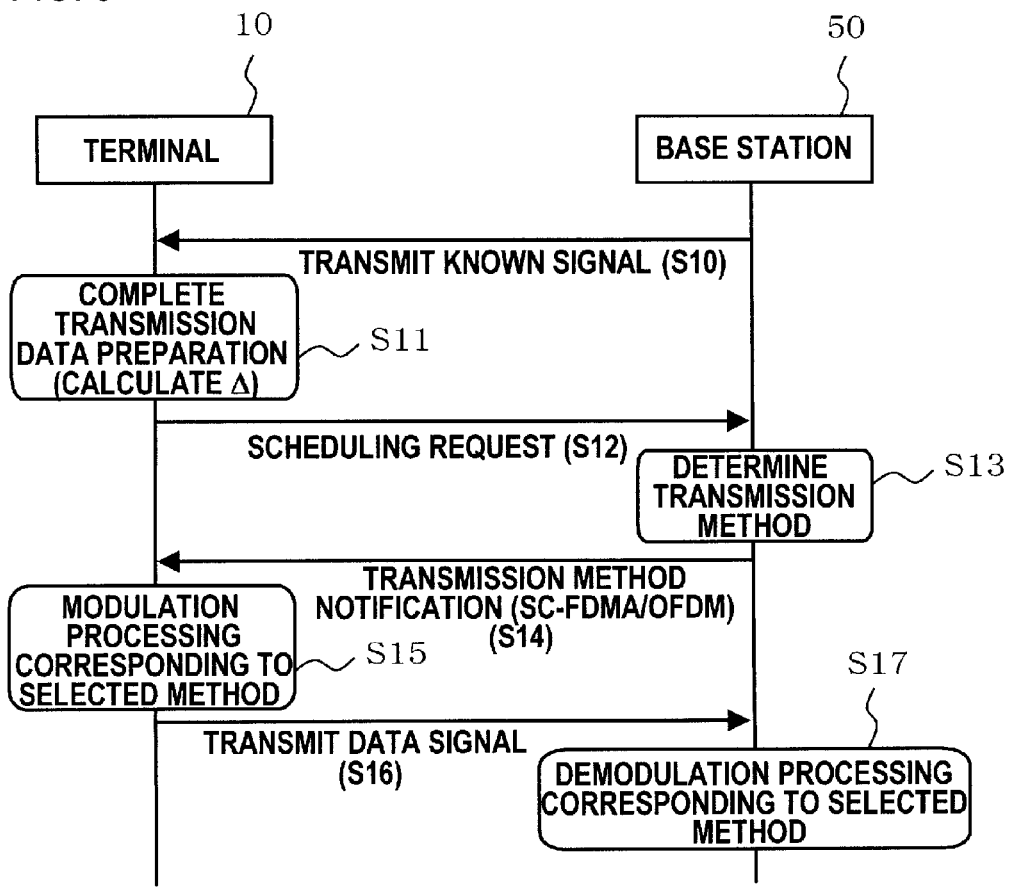
FIG. 5 illustrates an example of a sequence diagram indicating an overall operation.
Figure 6:
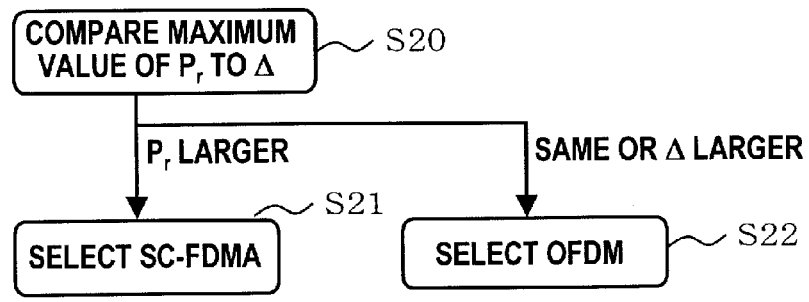
FIG. 6 illustrates a flowchart of an operational example indicating transmission method determination processing.

Next, the transmission method determination processing will be described in detail. FIG. 5 illustrates an example of a sequence diagram indicating an overall operation, and FIG. 6 illustrates a flowchart indicating an example of the transmission method determination processing.

First, the known signal transmission unit 51 of the base station 50 transmits the known signal to the terminal 10 (S10).

Next, the transmission power calculation unit 13 of the terminal 10 calculates the difference $\Delta$ between the maximum transmission power $P_{max}$ and the transmission power $P_t$ of the terminal 10 corresponding to its position (S11).

Next, the scheduling request transmission unit 17 of the terminal 10 transmits the scheduling request (S12). The $\Delta$ transmission unit 15 transmits the difference $\Delta$ at the transmission timing of the scheduling request. The $\Delta$ transmission unit 15 outputs the calculated difference $\Delta$ to the scheduling request transmission unit 17, and the scheduling request transmission unit 17 may transmit the scheduling request including the difference $\Delta$.

Next, the transmission method determination unit 55 of the base station 50 determines the transmission method (S13).

Next, the processing shifts to the transmission method determination processing (FIG. 6), in which the transmission method determination unit 55 compares the maximum value of the transmission power reduction amount $P_r$ with the difference $\Delta$ (S20). If the maximum value of the transmission power reduction amount $P_r$ is larger than the difference $\Delta$, the transmission method determination unit 55 selects SC-FDMA (S21). On the other hand, if the maximum value of the transmission power reduction amount $P_r$ and the difference $\Delta$ are identical or the difference $\Delta$ is larger than the maximum value of the transmission power reduction amount $P_r$, the transmission method determination unit 55 selects OFDM (S22).

Alternatively, the transmission method determination unit 55 may select SC-FDMA if the base station 50 detects that the transmission power of the mobile station exceeds a predetermined threshold, and may select OFDM if the base station 50 detects that the transmission power of the mobile station is smaller than the predetermined threshold.

Figure 7B:
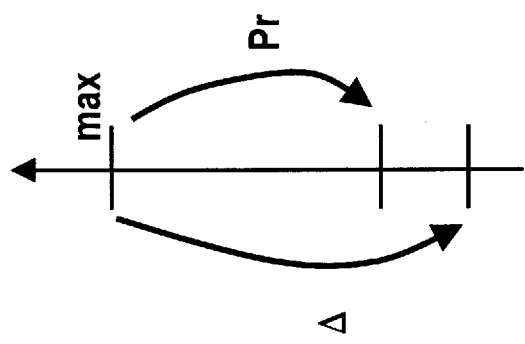
FIG. 7A and FIG. 7B illustrate examples of transmission power decrease widths.
Figure 7A:
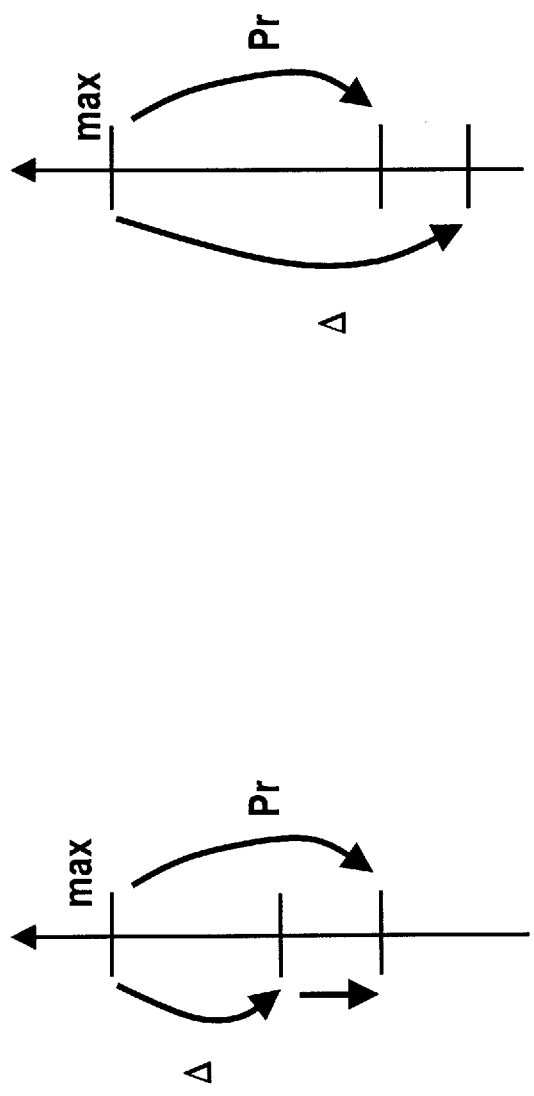

The reason for comparing the two values in this manner will now be described with reference to FIG. 7A and FIG. 7B. FIG. 7A illustrates an example in which the transmission power is set on the ordinate and the maximum value of the transmission power reduction amount $P_r$ is larger than the difference $\Delta$. FIG. 7B illustrates an opposite example.

As described above, the difference $\Delta$ indicates the transmission power decrease width from the maximum transmission power corresponding to the position of the terminal 10. On the other hand, (the maximum value of) the transmission power reduction amount $P_r$ indicates (a maximum value of) the decrease width by which the transmission power must be reduced from the maximum transmission power due to the constraints of the amplifier in order to satisfy the linearity of the amplifier in the terminal 10 and thereby satisfy the ACLR (the upper limit value of the out-of-band emission power). If (the maximum value of) the transmission power reduction amount $P_r$ is larger than the difference $\Delta$ (see FIG. 7A), this indicates that the terminal 10 should be capable of transmission at the decrease width $\Delta$ in accordance with its position, but the terminal 10 may transmit by excess reduced power due to the constraints of the amplifier.

A case in which the transmission power is reduced further due to the constraints of the amplifier corresponds to a case in which the terminal 10 is far from the base station 50. In other words, as described in the prior art, the PAPR is larger in OFDM than in SC-FDMA, and therefore, in OFDM, an average transmission power must be reduced below that of SC-FDMA in order to satisfy the linearity of the amplifier and thereby satisfy the ACLR standard. If the terminal 10 is positioned far from the base station 50, data is transmitted at the maximum transmission power as much as possible in order to increase a reception characteristic of the base station 50.

However, since the PAPR is large in OFDM, the average transmission power must be reduced to satisfy the linearity of the amplifier. If there is a case where the transmission power must be reduced in accordance with OFDM, SC-FDMA has better the reception characteristic of the base station 50, in which the average transmission power is large, than OFDM.

Hence, if the transmission power is reduced further due to the constraints of the amplifier, or in other words if the maximum value of the transmission power reduction amount $P_r$ is larger than the difference $\Delta$ (FIG. 7A), the transmission method determination unit 55 selects SC-FDMA as the transmission method.

On the other hand, if the difference $\Delta$ is equal to or greater than (the maximum value of) the transmission power reduction amount $P_r$ (FIG. 7B), the power decrease width $\Delta$ corresponding to the position is equal to or greater than (the maximum value of) the transmission power reduction width $P_r$, from the constraints of the amplifier, and therefore the transmission power is reduced sufficiently to satisfy the constraints of the amplifier. If the transmission power can be reduced in this manner, data can be transmitted sufficiently even if the terminal 10 is close to the base station 50, and even if data are transmitted using OFDM having a high PAPR, both the linearity of the amplifier and the ACLR are satisfied.

Hence, if the transmission power is low, or in other words if the transmission power reduction amount $P_r$ is equal to or smaller than the difference $\Delta$, the transmission method determination unit 55 selects OFDM. By the selection of OFDM, a radio characteristic is improved in comparison with SC-FDMA and scheduling is flexible.

In the first embodiment, the transmission method determination unit 55 reads from the MPR table 54 the maximum value (4.5 dB in the example illustrated in FIG. 4) of the transmission power reduction amount $P_r$. Alternatively, the maximum value of the transmission power reduction amount $P_r$ is stored in the MPR table 54 alone as a threshold. The transmission method determination unit 55 may then compare the threshold with the difference $\Delta$.

Returning to FIG. 5, the transmission method transmission unit 56 of the base station 50 notifies the determined transmission method to the terminal 10 (S14).

The data signal modulation unit 19 of the terminal 10 modulates the transmission data in accordance with the notified transmission method (S15).

Next, the data signal transmission unit 20 of the terminal 10 transmits the data signal to the base station 50 (S16).

Next, the data reception unit 57 of the base station 50 demodulates the data signal in accordance with the selected transmission method (S17). The series of processes is then terminated.

Hence, in this embodiment, data are not transmitted uniformly by SC-FDMA on the uplink, and the data may be transmitted after switching to OFDM, for example. OFDM has better radio characteristic than SC-FDMA, and therefore an improvement in the radio characteristic can be achieved in comparison with a case in which the data are transmitted uniformly by SC-FDMA.

Further, with OFDMA, resource allocation scheduling not using sub-carriers that are continuous on the frequency axis can be performed, and therefore scheduling flexibility can be secured in comparison with a case in which the data are transmitted uniformly by SC-FDMA.

As a result, an improvement in throughput can be achieved.

Note that in the example described above, the determinations as to whether or not the transmission power of the terminal 10 has exceeded the predetermined threshold and whether or not the maximum value of the transmission power reduction amount $P_r$ is larger than the difference $\Delta$ are made in the base station 50, but the mobile station may include the transmission method determination unit 55.

By inputting the difference $\Delta$ and the transmission power as is into the transmission method determination unit 55 of the mobile station from the transmission power calculation unit 13, the transmission method can be determined by the mobile station.

More specifically, when the transmission method determination unit 55 of the mobile station detects that its own transmission power has exceeded the predetermined threshold or that the maximum value of the transmission power reduction amount $P_r$ is larger than the difference $\Delta$, the transmission method determination unit 55 controls the data modulation unit 19 such that transmission is performed using the SC-FDMA method.

Also, when the transmission method determination unit 55 of the mobile station detects that its own transmission power is lower than the predetermined threshold or that the maximum value of the transmission power reduction amount $P_r$ is smaller than the difference $\Delta$, the transmission method determination unit 55 controls the data modulation unit 19 such that transmission is performed using the OFDM method.

Preferably, before switching the method, the base station 50 can notify the switch destination method (the SC-FDMA method or the OFDM method) before the method is switched by making the switch destination method transmit to the base station 50 from the data signal transmission unit 20. Even if the notification is not performed, the switch destination method can be detected by having the base station 50 perform reception processing in relation to both methods respectively.

Further, an embodiment in which the positions of the base station and the mobile station are interchanged may be applied.

[Second Embodiment]

Next, a second embodiment will be described. In the first embodiment, the transmission method determination unit 55 compares the maximum value of the transmission power reduction amount $P_r$ with the difference $\Delta$. In the second embodiment, the transmission method is determined by comparing the transmission power reduction amount $P_r$ with the difference $\Delta$, after selecting the modulation method and the number of resource blocks, and reading corresponding items from the MPR table 54.

The overall configuration of the radio communication system 1 and the respective configurations of the terminal 10 and the base station 50 are identical to those of the first embodiment (see FIG. 1 to FIG. 3). Further, the processing up to the point at which the base station 50 receives the scheduling request from the terminal 10 (S12 of FIG. 5) is similar to that of the first embodiment.

The transmission method determination unit 55 inputs the scheduling request from the scheduling request reception unit 53, and performs the transmission method determination processing (S13).

Figures 8, 9:
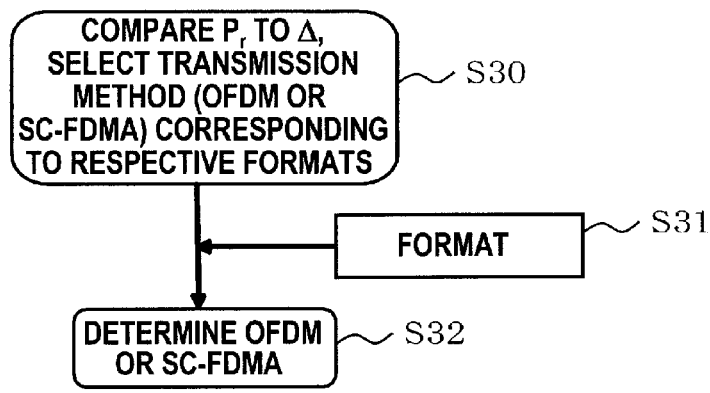
FIG. 8 illustrates a flowchart of another operational example of transmission method determination processing.
FIG. 9 illustrates an example of an MPR table.

FIG. 8 illustrates flowchart indicating operational example of the transmission method determination processing, and FIG. 9 illustrates an example of the MPR table 54.

When the transmission method determination unit 55 selects the transmission method (S30), the transmission method determination unit 55 selects on the basis of a determined format (the modulation scheme and the number of resource blocks) (S31).

For example, the transmission method determination unit 55 determines a format in which the modulation scheme is "16QAM" and the number of resource blocks is "1". The transmission method determination unit 55 then reads corresponding items from the MPR table 54. FIG. 9 illustrates an example of the MPR table 54 indicating the corresponding items. The transmission method determination unit 55 then reads the transmission power reduction amount $P_r$ of the OFDM method from the corresponding items. In the example illustrated in FIG. 9, the transmission power reduction amount $P_r$ is "3". The transmission method determination unit 55 compares the read transmission power reduction amount $P_r$ (="3") of the OFDM method with the difference $\Delta$, and then selects SC-FDMA if the transmission power reduction amount $P_r$ is greater than the difference $\Delta$, and selects OFDM if the transmission power reduction amount $P_r$ is equal to or smaller than the difference $\Delta$, similarly to the first embodiment (S32). Subsequent processing is similar to that of the first embodiment.

The reason why the transmission method determination unit 55 reads the transmission power reduction amount $P_r$ of OFDM, from among the two transmission power reduction amounts $P_r$ of OFDM and SC-FDMA, is that the power reduction amount $P_r$ of OFDM is larger than that of SC-FDMA and strict condition becomes standard.

Note that in the second embodiment, the format may be determined by the scheduling request reception unit 53 rather than the transmission method determination unit 55. In this case, the scheduling request reception unit 53 outputs the determined format to the transmission method determination unit 55, and the transmission method determination unit 55 performs the processing described above on the basis of the format.

[Third Embodiment]

Next, a third embodiment will be described. The transmission method is selected further taking the transmission bit count into consideration in the third embodiment in comparison with the second embodiment.

The terminal 10 transmits to the base station 50 the scheduling request including a data amount (the transmission bit count) (FIG. 2, S12 of FIG. 5). If the transmission bit count is small, the terminal 10 can reduce the transmission power further. The transmission method determination unit 55 sets a decrease width corresponding to the transmission bit count as $\Delta 1$ and determines the transmission method by comparing ($\Delta+\Delta 1$) (decrease width ($\Delta+\Delta 1$) hereinafter) with the transmission power reduction amount $P_r$.

Figure 11:
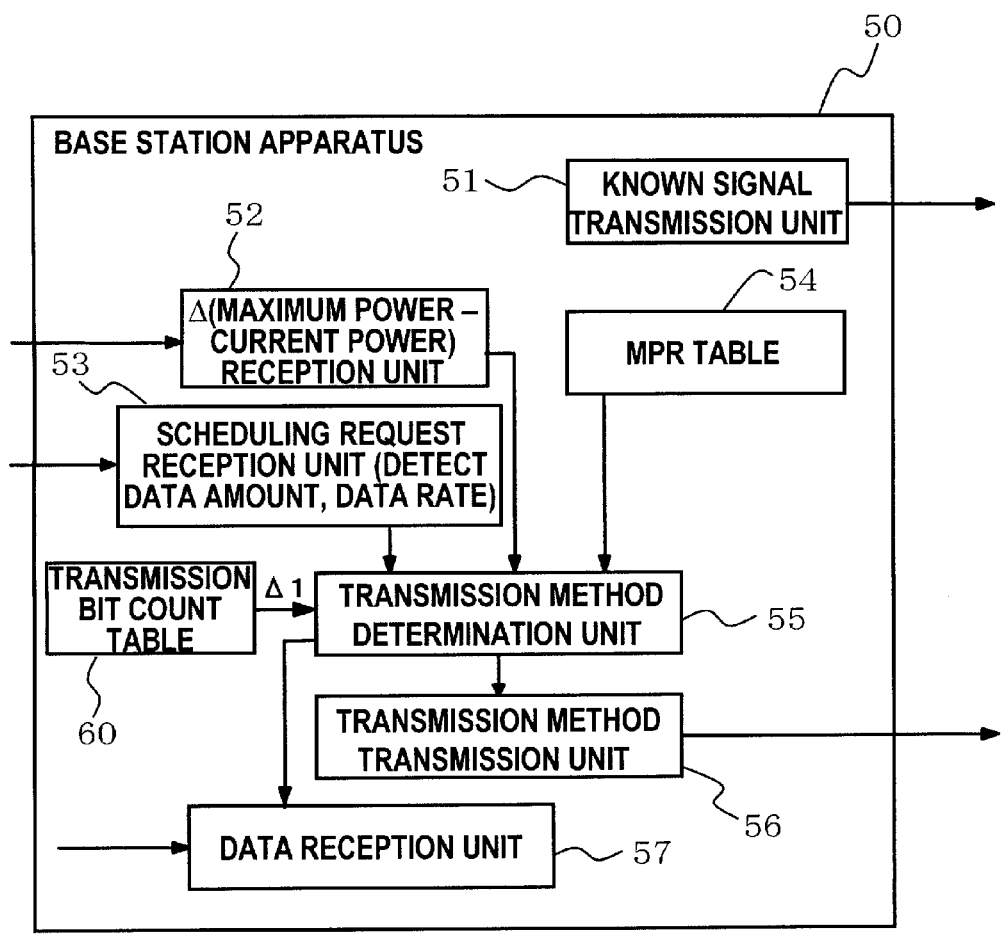
FIG. 11 illustrates another configuration example of a base station apparatus.

The configurations of the radio communication system 1, the terminal 10, and the base station 50 according to the third embodiment are similar to those of the first embodiment. However not that the transmission method determination unit 55 determines the power decrease width Δ1 corresponding to the transmission bit count. For example, the determination is such that the transmission method determination unit 55 includes a table of decrease widths Δ1 corresponding to transmission bit counts and reads the decrease width Δ1 corresponding to the transmission bit count from the table of decrease width Δ1. Alternatively, the transmission method determination unit 55 stores inside a formula for calculating the decrease width from the transmission bit count, may calculates and determine the decrease width Δ1 from the formula. Alternatively, the base station apparatus 50 further includes a transmission bit count table 60 as illustrated in FIG. 11, and the transmission method determination unit 55 may read the decrease width Δ1 corresponding to the transmission bit count.

Figure 10:
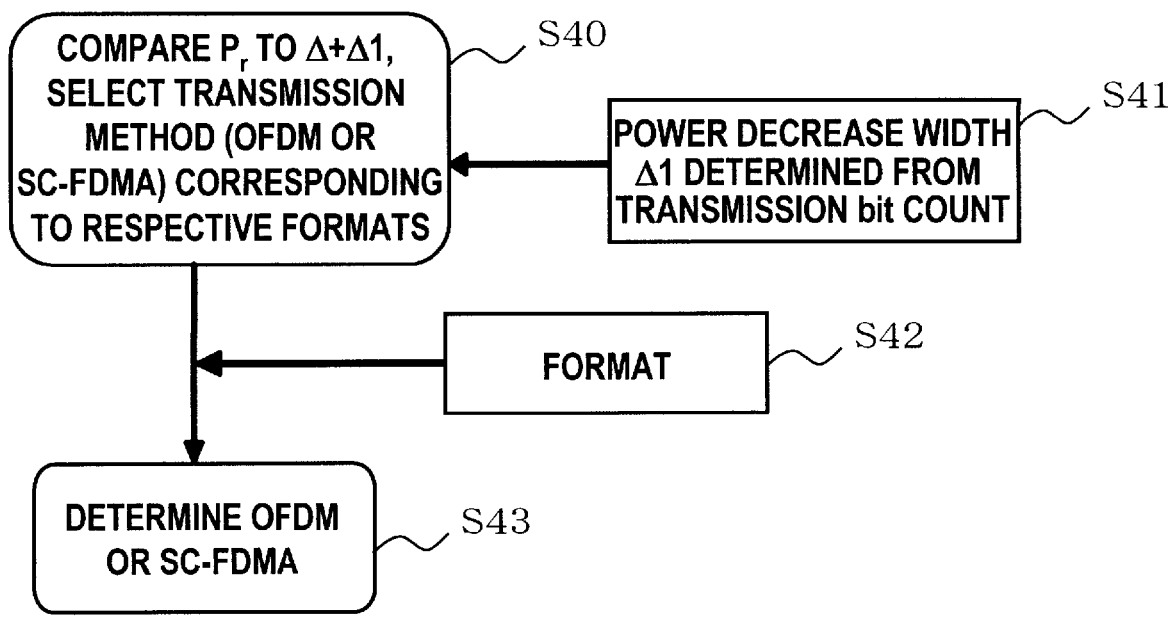
FIG. 10 illustrates a flowchart of another operational example of transmission method determination processing.

FIG. 10 illustrates a flowchart indicating an example of transmission method determination processing according to the third embodiment. This processing is similar to the processing of the first embodiment up to the point at which the base station 50 receives the scheduling request.

If the transmission method determination unit 55 inputs the scheduling request from the scheduling request reception unit 53, the transmission method determination unit 55 determines the power decrease width Δ1 on the basis of the transmission bit count included in the scheduling request (S41) and selects the transmission method corresponding to the format in the similar manner to the second embodiment (S40, S42).

And, if the power reduction amount $P_r$ of OFDM is larger than the decrease width (Δ+Δ1), the transmission method determination unit 55 selects SC-FDMA, and if the power reduction amount $P_r$ of OFDM is not larger than the decrease width (Δ+Δ1), the transmission method determination unit 55 selects OFDM (S43). In other words, if the amount of transmission data is small enough to be transmitted at a low transmission power, OFDM is selected, and if not, SC-FDMA is selected. Subsequent processing is similar to that of the first embodiment.

Further, note that in the third embodiment, an encoding ratio may be used in addition to the transmission bit count. The transmission bit count table 60 stores decrease widths Δ1 corresponding to encoding ratios. When the scheduling request reception unit 53 receives the scheduling request, the scheduling request reception unit 53 determines the encoding ratio and outputs to the transmission method determination unit 55. The transmission method determination unit 55 then determines the transmission method by reading the decrease width Δ1 corresponding to the encoding ratio from the table 60.

[Fourth Embodiment]

Next, a fourth embodiment will be described. In the fourth embodiment, if the base station 50 receives an instruction to reduce the power of the terminal 10 from a network (another base station, for example, although the network may be the base station 50 itself), the transmission method is determined taking into consideration a power decrease width Δ2 corresponding to the instruction.

The instruction is also known as an Overload Indicator, and if the transmission power of the terminal 10 is large such that interference is applied to the terminal of another cell, the transmission power of the terminal 10 is reduced in accordance with the instruction.

Figure 12:
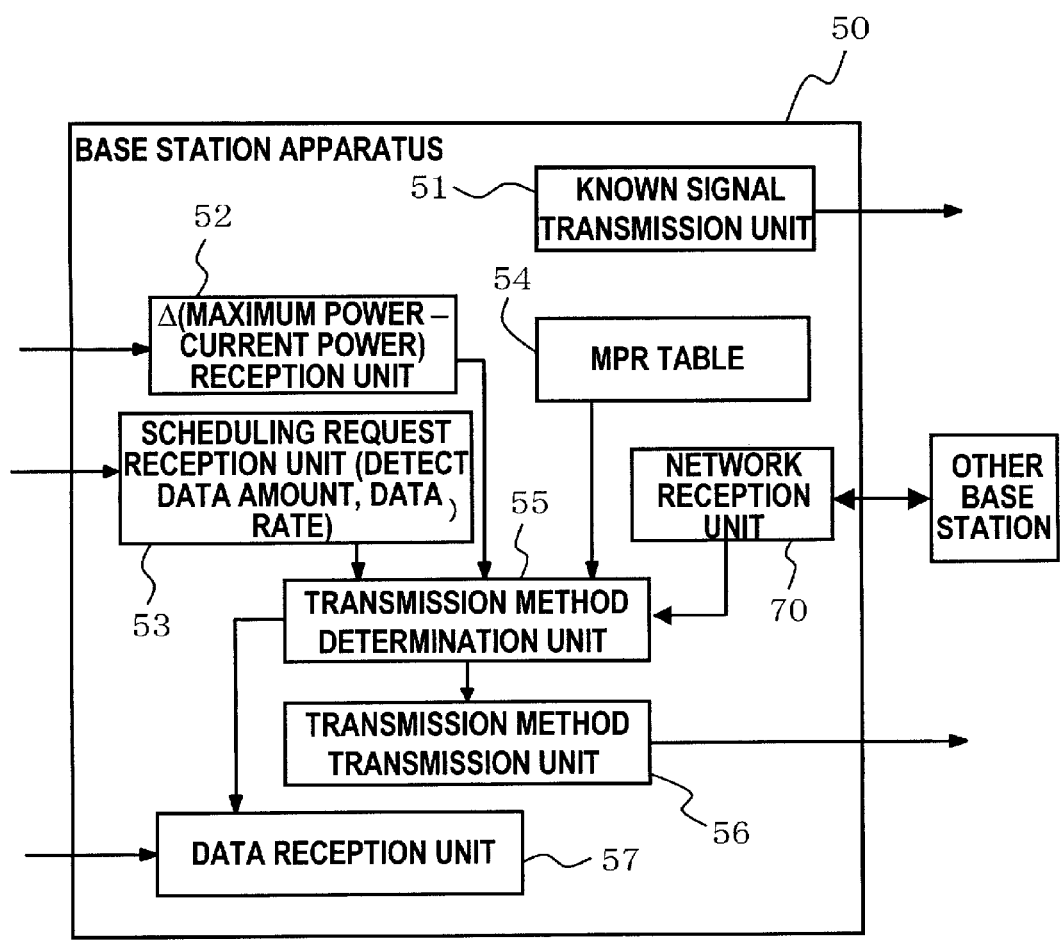
FIG. 12 illustrates another configuration example of a base station apparatus.

The configuration of the radio communication system 1 and the terminal 10 is similarly to their counterparts in the first embodiment. FIG. 12 illustrates a configuration example of the base station 50. As illustrated in the FIG. 12, the base station 50 includes a network reception unit 70 so as to be capable of receiving the instruction (Overload Indicator) from another base station via the network.

Figure 13:
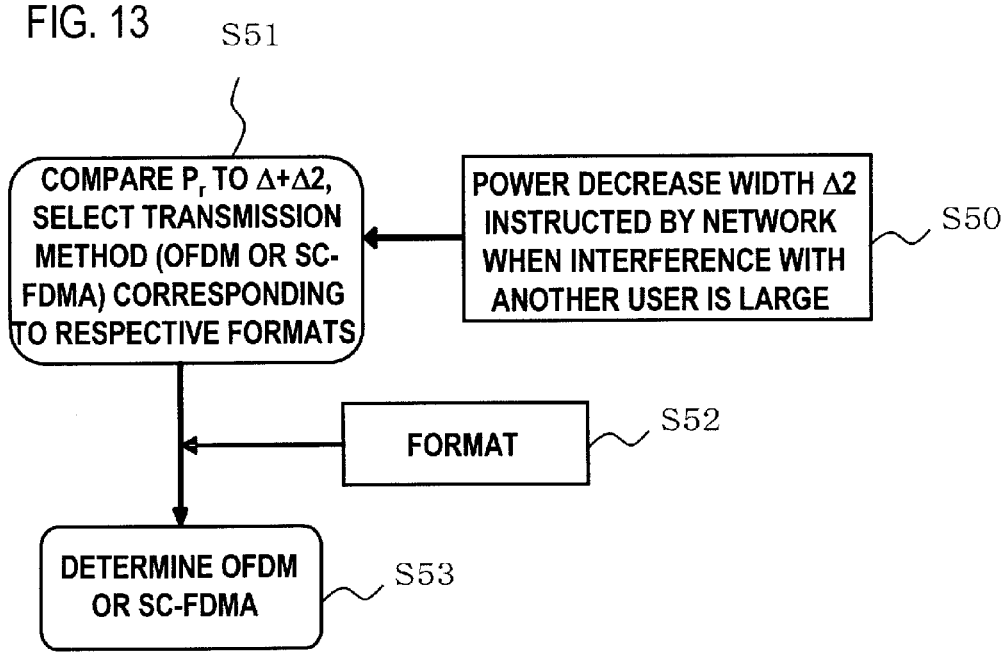
FIG. 13 illustrates a flowchart of another operational example of transmission method determination processing.

FIG. 13 illustrates a flowchart indicating an example of the transmission method selection processing. The processing up to the point at which the base station 50 receives the scheduling request (S12 in FIG. 5) is similar to that of the first embodiment.

If the network reception unit 70 receives the instruction from another base station, the network reception unit 70 outputs the power decrease width Δ2 corresponding to the instruction (S50). For example, the network reception unit 70A includes inside a table, and reads the corresponding decrease width Δ2 from the table and outputs.

The transmission method determination unit 55 determines the format in a similar manner to the second embodiment (S52), reads the corresponding items from the MPR table 54, compares the decrease width (Δ+Δ2) with the transmission power reduction amount $P_r$ of OFDM, and determines the transmission method (S51, S53).

More specifically, if the power reduction amount $P_r$ of OFDM is larger than the decrease width (Δ+Δ2), the transmission method determination unit 55 selects SC-FDMA, and if the power reduction amount $P_r$ of OFDM is not larger than the decrease width (Δ+Δ2), the transmission method determination unit 55 selects OFDM (S53). In other words, if transmission can be performed at a sufficiently low transmission power in accordance with the instruction, OFDM is selected, and if not, SC-FDMA is selected. Subsequent processing is similar to that of the first embodiment and so on.

[Fifth Embodiment]

Next, a fifth embodiment will be described. The fifth embodiment is an example of a case in which the transmission method is determined according to whether or not the terminal 10 performs MIMO (Multiple-Input Multiple-Output) transmission.

MIMO is a method for obtaining a transmission signal by receiving transmission signal transmitted from a plurality of transmission antennae in a single reception antenna and synthesizing the reception signal such that the reception signal is canceled. MIMO is used to obtain further throughput in an environment having a favorable reception SIR (Signal to Interference Ratio).

However, if transmission is performed using SC-FDMA, the reception signal is processed on a reception side by using a frequency equalizer, and due to the frequency equalizer, inter-stream interference cannot be eliminated. As a result, weighting coefficients relating respectively to the MIMO inter-stream interference and multipath interference become contradictory, and problem to deteriorate the reception signal characteristic occurs.

On the other hand, in OFDM, the reception side may not use the frequency equalizer and the sub-carrier is orthogonal, and therefore multipath interference does not occur during reception signal processing even if any weighting coefficient is used. Accordingly, reception can be performed using the weighting coefficient for eliminating the inter-stream interference of MIMO.

Figure 14:
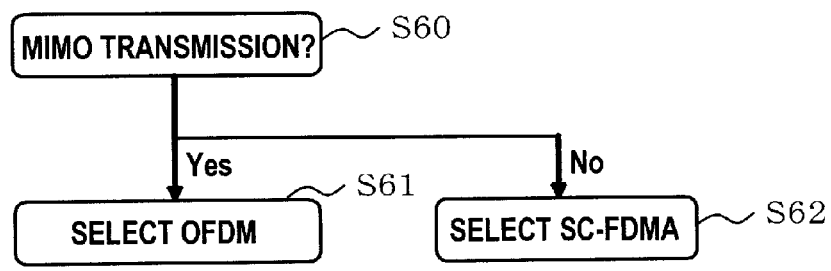
FIG. 14 illustrates a flowchart of another operational example of transmission method determination processing.

Hence, the transmission method determination unit 55 according to the fifth embodiment selects OFDM if MIMO transmission is to be performed, and selects SC-FDMA if MIMO transmission is not to be performed (S60 to S62 in FIG. 14).

The scheduling request transmission unit 17 of the terminal 10 transmits the scheduling request including an information indicating whether or not MIMO transmission is to be performed. The transmission method determination unit 55 may read the information from the scheduling request, and determine the transmission method.

If MIMO transmission is performed, the data is transmitted from the terminal 10 by using OFDMA, and therefore the radio characteristic of the reception signal deteriorates to a smaller extent than if transmission is performed by using SC-FDMA.

[Sixth Embodiment]

Next, a sixth embodiment will be described. In the first to fifth embodiments, the calculation of the difference Δ is performed in the terminal 10. The sixth embodiment is an example of a case in which the base station 50 calculates the difference Δ.

Figure 15:
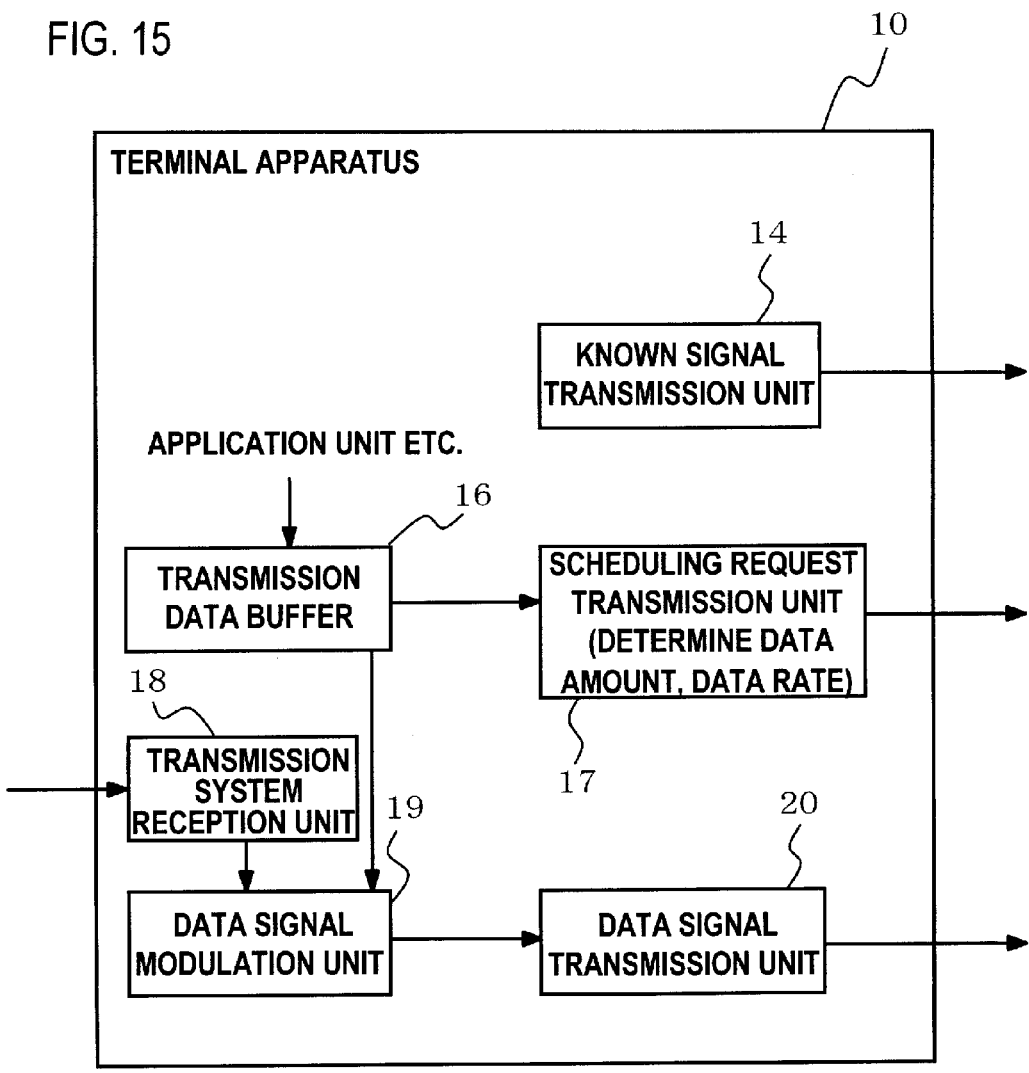
FIG. 15 illustrates another configuration example of a terminal apparatus.
Figure 16:
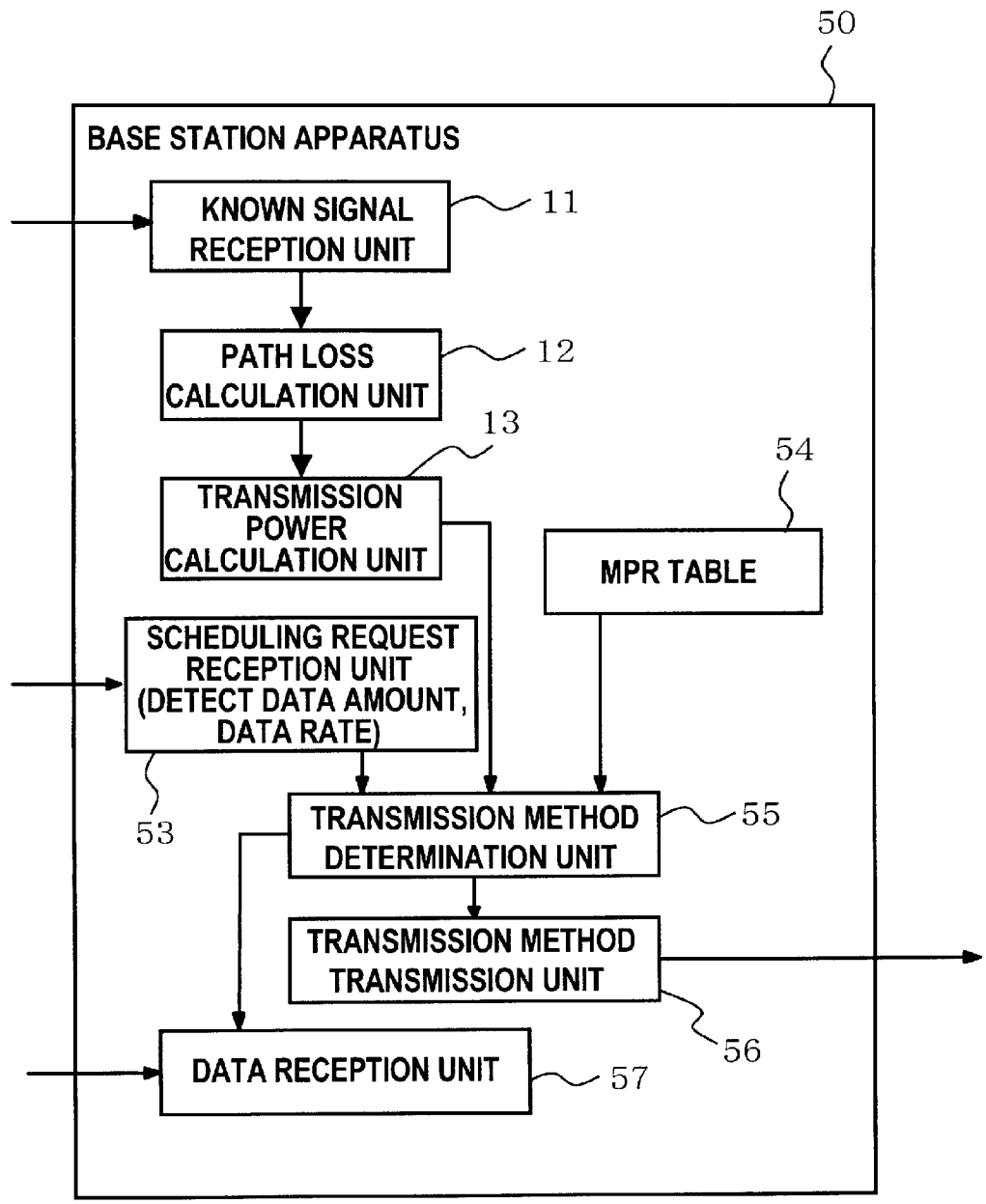
FIG. 16 illustrates another configuration example of a base station apparatus.
Figure 17:
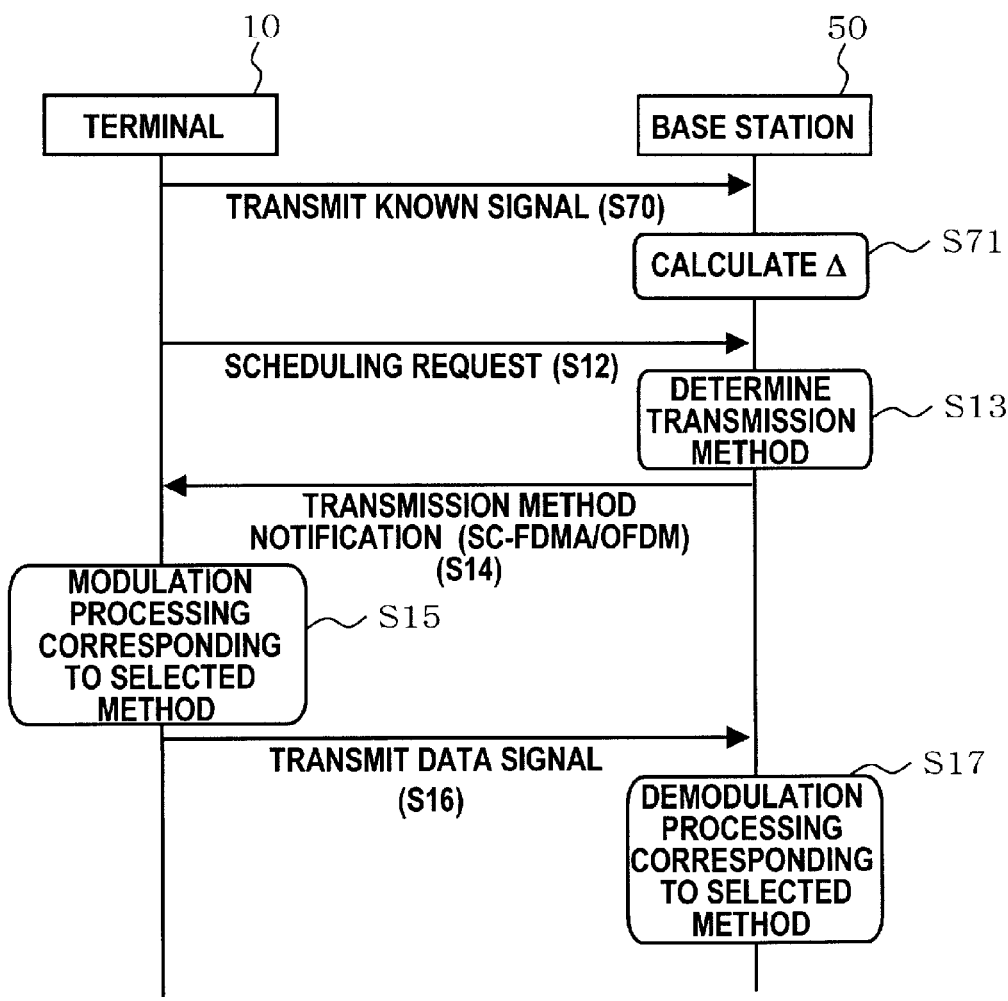
FIG. 17 illustrating a flowchart of another example of overall processing.
Figure 18:
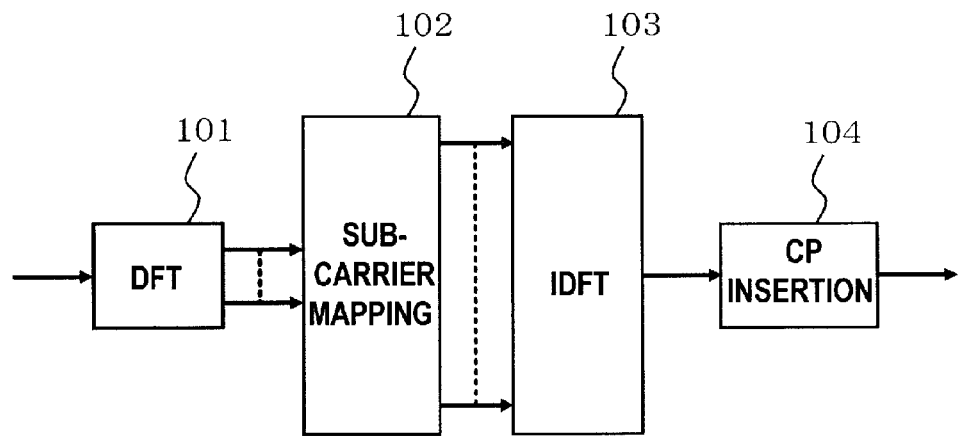
FIG. 18 illustrates a configuration example of a signal processing circuit in a case where SC-FDMA is employed.
Figure 19:
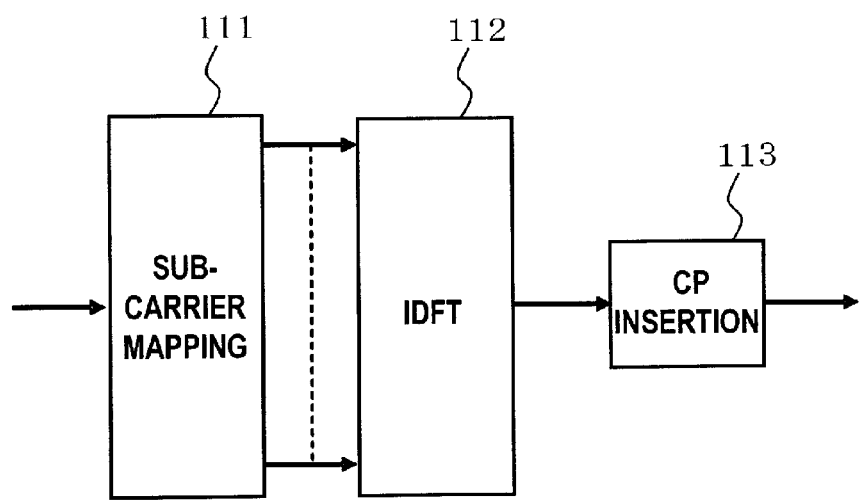
FIG. 19 illustrates a configuration example of a signal processing circuit in a case where OFDM is employed.
Figure 20:
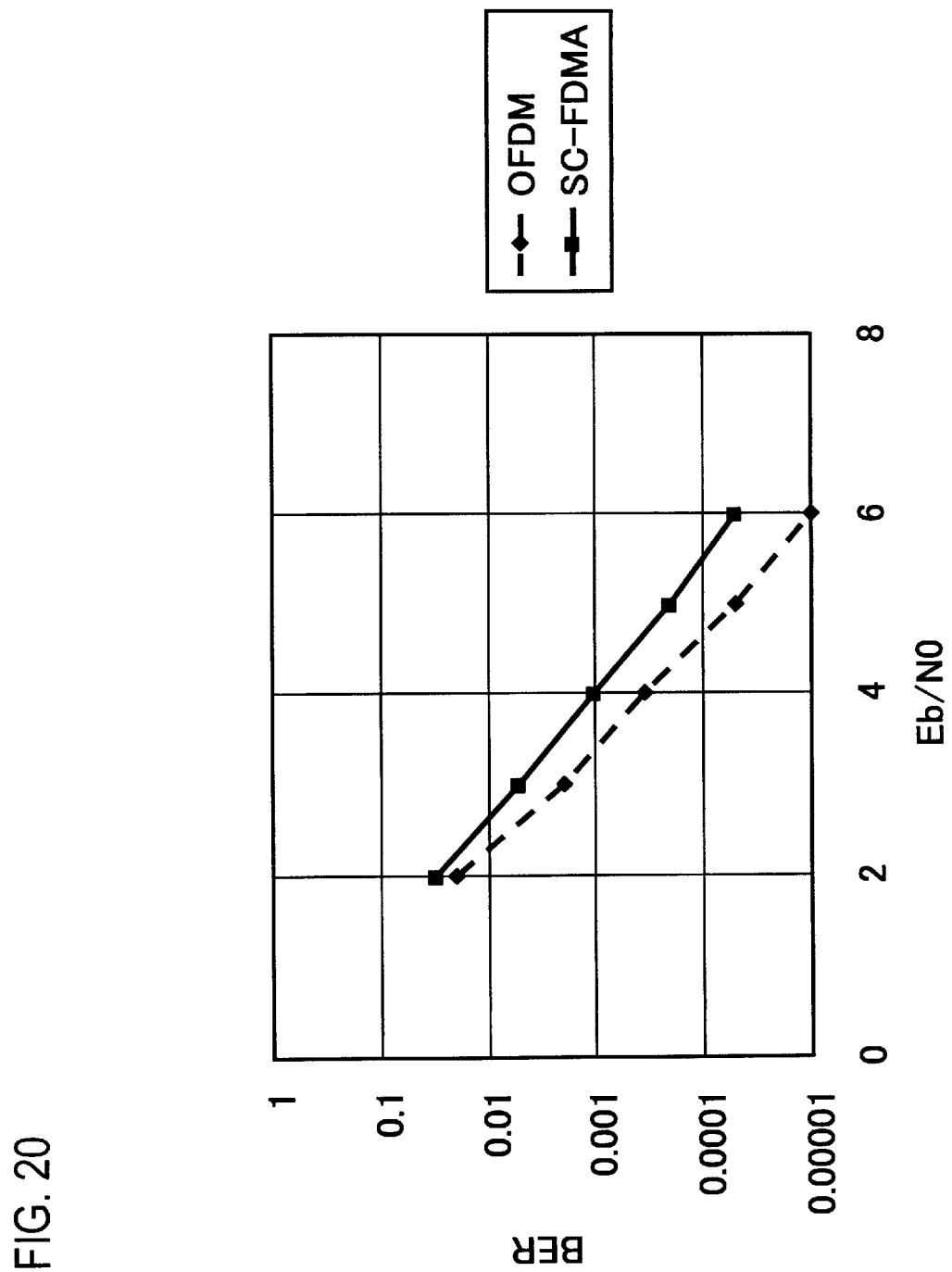
FIG. 20 illustrates a graph of characteristic example of SC-FDMA and OFDM.

FIG. 15 and FIG. 16 illustrates a configuration example of the terminal 10 and the base station 50 respectively, and FIG. 17 illustrates a sequence diagram of overall processing. In the sixth embodiment, the base station 50 calculates the difference Δ, and therefore the base station 50 includes the known signal reception unit 11, the path loss calculation unit 12, and the transmission power calculation unit 13.

The known signal transmission unit 14 of the terminal 10 transmits the known signal to the base station 50 (S70).

Next, the known signal reception unit 11 of the base station 50 receives the known signal, and the transmission power calculation unit 13 calculates the difference Δ between the maximum transmission power $P_{max}$ and the transmission power $P_t$ corresponding to the current position, by using (Numeral 1) and so on (S71). Subsequent processing is similar to that of the first embodiment. The sixth embodiment may also be applied to any of the second to fourth embodiments.

The invention claimed is:

1. A radio communication method in a radio communication system which performs radio communication between a terminal apparatus and a base station apparatus, the radio communication method comprising:
   selecting a first transmission method if the terminal apparatus transmits transmission signal by MIMO or selecting a second transmission method if the terminal apparatus transmits the transmission signal regardless of MIMO, in the base station apparatus; and
   transmitting the transmission signal to the base station apparatus by the selected first or second transmission method, in the terminal apparatus.

2. The radio communication method according to claim 1, wherein PAPR of the first transmission method is larger than PAPR of the second transmission method.

3. A terminal apparatus for performing radio communication with a base station apparatus, the terminal apparatus comprising:
   a reception unit which receives from the base station apparatus transmission method selection information indicating that a first transmission method is selected if the terminal apparatus transmits transmission signal by MIMO or a second transmission method is selected if the terminal apparatus transmits the transmission signal regardless of MIMO; and
   a transmission unit which transmits the transmission signal to the base station apparatus by the first or second transmission method based on the transmission method selection information.

4. The radio communication method according to claim 3, wherein PAPR of the first transmission method is larger than PAPR of the second transmission method.

5. A base station apparatus for performing radio communication with a terminal apparatus, the base station apparatus comprising:
   a selection unit which selects a first transmission method if the terminal apparatus transmits transmission signal by MIMO or selects a second transmission method if the terminal apparatus transmits the transmission signal regardless of MIMO; and
   a transmission unit which transmits transmission method selection information indicating the selected first or second transmission method to the terminal apparatus,
   wherein the terminal apparatus transmits the transmission signal by the selected first or second transmission method.

6. The radio communication method according to claim 5, wherein PAPR of the first transmission method is larger than PAPR of the second transmission method.

7. A radio communication system, comprising:
   a terminal apparatus; and
   a base station apparatus, wherein
   radio communication is performed between the terminal apparatus and the base station apparatus,
   the base station apparatus includes:
   a selection unit which selects a first transmission method if the terminal apparatus transmits transmission signal by MIMO, or selects a second transmission method if the terminal apparatus transmits the transmission signal regardless of MIMO; and
   a transmission unit which transmits transmission method selection information indicating the selected first or second transmission method, and
   the terminal apparatus includes:
   a reception unit which receives the transmission method selection information; and
   a transmission unit which transmits the transmission signal to the base station apparatus by the first or second transmission method based on the transmission method selection information.

8. The radio communication method according to claim 7, wherein PAPR of the first transmission method is larger than PAPR of the second transmission method.

* * * * *